United States Patent [19]

Walter

[11] Patent Number: 4,556,381

[45] Date of Patent: Dec. 3, 1985

[54] PRESS FOR PRODUCING PELLETS FROM BULK MATERIAL

[76] Inventor: Ulrich Walter, Alterweg 17, D-4020 Mettmann 2, Fed. Rep. of Germany

[21] Appl. No.: 597,449

[22] Filed: Apr. 6, 1984

[30] Foreign Application Priority Data

Apr. 9, 1983 [DE] Fed. Rep. of Germany ....... 3312785

[51] Int. Cl.⁴ .............................................. B28B 3/12
[52] U.S. Cl. ..................................... 425/331; 74/578; 425/DIG. 230
[58] Field of Search ..................... 425/331, DIG. 230; 264/109, 115, 118; 74/578; 100/903, 905

[56] References Cited

U.S. PATENT DOCUMENTS 2,240,660  5/1941  Meakin ................................. 425/331
3,354,845 11/1967  Schultz ..................... 425/DIG. 230
3,511,190  5/1970  Kunz ........................ 425/DIG. 230
3,745,843  7/1973  Hetzel .................................. 74/578

Primary Examiner—Jay H. Woo
Assistant Examiner—Timothy W. Heitbrink
Attorney, Agent, or Firm—Karl F. Ross; Herbert Dubno

[57] ABSTRACT

Press for producing pellets from bulk material with an annular perforated die rotatable about its axis and with a non-rotatable holder, arranged coaxially therein, of press rollers which virtually touch the die with their circumference, while a wheel which is attached to the shaft of the die exhibits on its circumference projections which can be engaged in each case by a hydraulically slidable ram mounted in the housing of the press and movable counter to a spring force.

2 Claims, 2 Drawing Figures

PRESS FOR PRODUCING PELLETS FROM BULK MATERIAL

FIELD OF THE INVENTION

The invention relates to a press for producing pellets from bulk material, particularly livestock feed pellets which may consist of more or less coarse granular feeds, straw and other substances.

The invention especially relates to a press of this type which has an annular die with a plurality of radial press channels, and therein a holder, coaxial with the die, for press rollers, each of which virtually touches the die with its circumference.

BACKGROUND OF THE INVENTION

In presses of this type the resistance between press rollers and die can at times become so great that the drive motor of the die is no longer adequate to rotate the die. This occurs particularly after a stoppage of the press already charged with material for processing. In such cases it is necessary for the press to be cleared out, which results in a substantial labor outlay and a prolonged stoppage of the press.

OBJECT OF THE INVENTION

The object of the invention is to produce a press which avoids these disadvantages.

SUMMARY OF THE INVENTION

According to the invention this object is achieved when a wheel which is attached to the shaft of the die is formed with projections on its circumference and a hydraulic ram is arranged on the housing of the press so as to move counter to a spring force in the plane of the wheel so that, by engaging behind one of the projections in each case, it can rotate the wheel in steps by applying tangential thrust thereto.

The projections of the wheel are preferably sawtooth-shaped and oriented so that the ram abuts in each case on that short flank of such a projection which forms a hollow surface.

BRIEF DESCRIPTION OF THE DRAWING

An exemplary embodiment of the invention is illustrated in the drawing, wherein.

SPECIFIC DESCRIPTION

Figure 1:
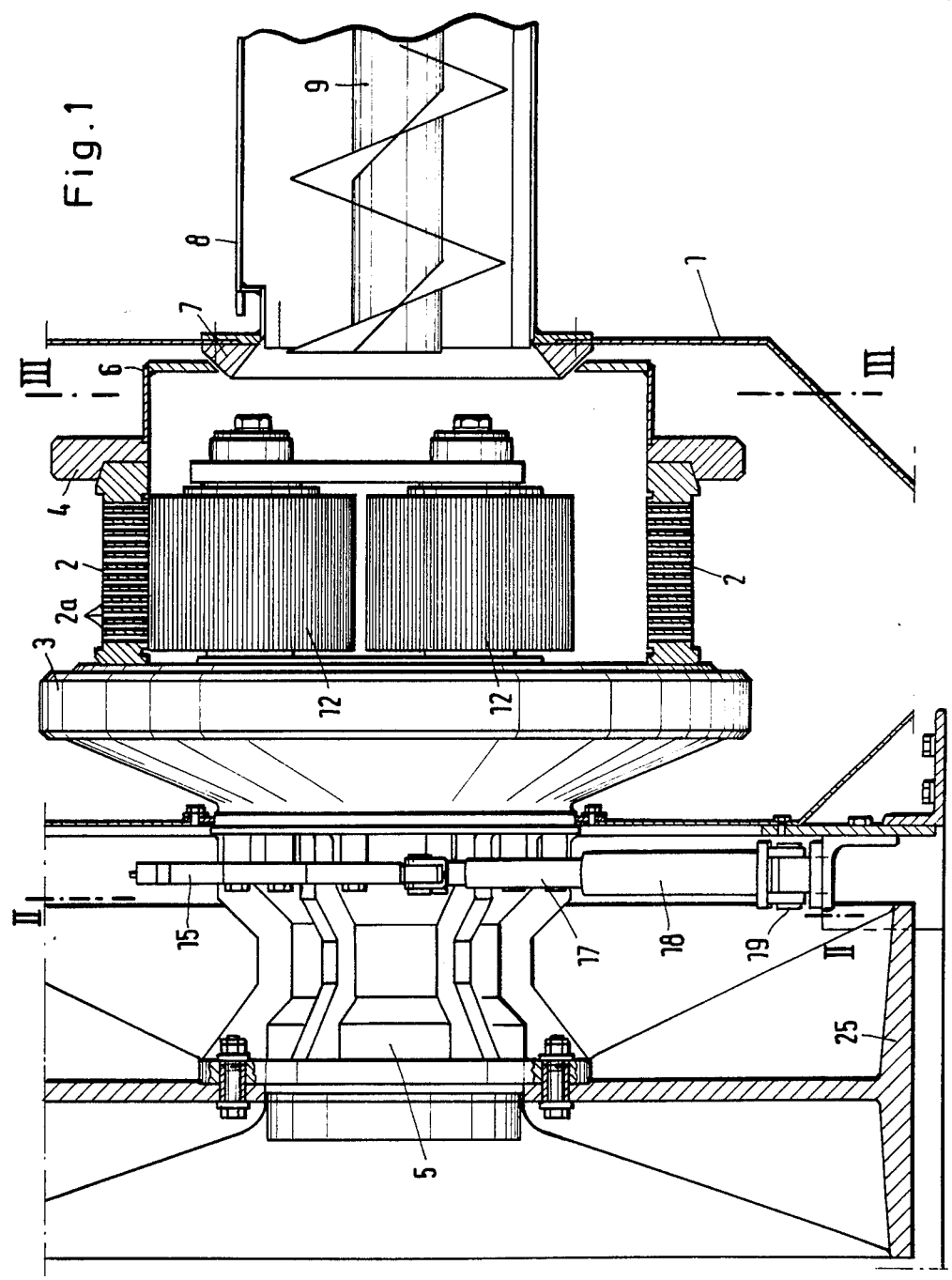
FIG. 1 is an axial longitudinal section through the essential part of a press according to the invention.

A shaft which is mounted in a housing and driven by means of a belt pulley 25 has a tubular section 5 which ends in a flange 3. An annular die 2, which has a plurality of radial bores 2a, is firmly clamped between the flange 3 and a flange 4 concentric thereto. The flange 4 is adjoined by an inlet tube 6, the inner edge of which is adjacent a sealing ring 7 of the housing 1. A transport screw 9, which can transport bulk material into the interior of the die 2, is mounted in a pipe spigot 8 projecting into the orifice of the sealing ring 7.

Three press rollers 12, which are arranged at equal angular intervals in the interior space of the die 2, rotate freely about axes parallel to the tubular shaft 5 and are adjustable radially to the die 2 in known manner by means of adjusting devices so that their spacing from the internal circumference of the die 2 is adjustable.

Figure 2:
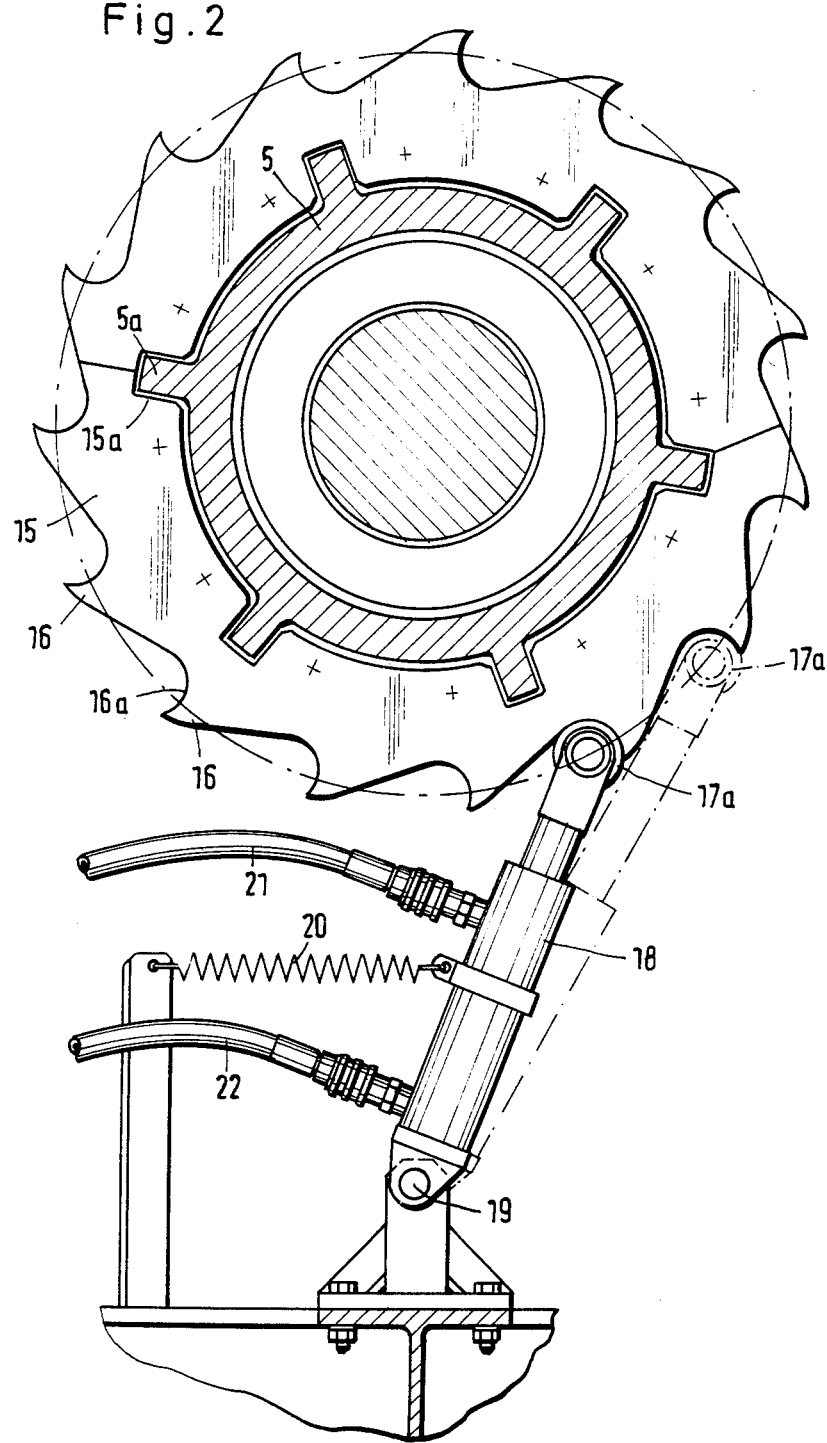
FIG. 2 is a section along the line II—II of FIG. 1.

The tubular shaft section 5 has radial projections 5a (see FIG. 2) on which a disc-shaped wheel 15 is mounted, which has corresponding recesses 15a on its internal circumference. The external circumference of the wheel 15 is formed by a plurality of sawtooth-shaped projections 16. The short surfaces (flanks) 16a of these sawtooth-shaped projections form hollow surfaces. A ram 17, which is advanceable by a hydraulic cylinder 18, abuts on one of these hollow surfaces 16a with its head 17a. The cylinder 18 is pivotable in the plane of the wheel 15 about an axis 19 parallel to the axis of shafts. The head 17a of the ram 17 is drawn towards the circumference of the wheel 15 by a spring 20 attached to the cylinder 18. The cylinder 18 is connected by hoses 21, 22 to a hydraulic fluid source in such a way that the ram 17 is moved upwards by the hydraulic fluid and can therefore rotate the wheel 15 about its axis during the upward movement. As soon as the ram head 17a has reached its highest position 17a', the supply of fluid to the cylinder 18 is reversed so that hydraulic fluid is discharged. Consequently the ram head 17a falls downwards and is drawn towards the circumference of the wheel 15 by the spring 20, so that it engages into a tooth surface 16a of the next tooth. It is therefore possible, by means of the ram 17, for the die 2 to be rotated relative to the press rollers 12, and thus released from a jammed position, even when the drive motor of the die is inadequate to set the die in motion.

I claim:

1. A press for producing pellets from bulk material comprising, in combination:

an annular die formed with a plurality of radial press channels;

a holder positioned within said die;

a plurality of rollers mounted on said holder and juxtaposed with an inner surface of said die for rolling engagement with a bulk material introduced into the interior of said die for pressing said bulk material into said channels;

a shaft connected with said die for rotating said die relative to said holder, thereby displacing the inner periphery of said die relative to said holder and said rollers about a common axis of said shaft, said die and said holder;

means for connecting said shaft with a motor for rotating said shaft and said die;

a wheel affixed to said shaft and provided along its circumference with an array of projections;

a hydraulic ram pivotally mounted so that an actuating end of said ram can successively engage behind said projections to step said wheel angularly upon reciprocation of said ram, said ram being oriented so that force applied thereby to said wheel to step said wheel is effective tangentially with respect to the circumference of said wheel; and spring means applying a biasing force to said ram in a plane of said ram and said wheel for biasing said ram against said wheel.

2. The combination defined in claim 1 wherein said projections are generally sawtooth-shaped and said ram engages behind a short flank of each projection which is curved to form a hollow surface.

* * * * *